US012753971B2

(12) United States Patent
Maguire

(10) Patent No.: US 12,753,971 B2
(45) Date of Patent: Oct. 6, 2026

(54) RESIN DRYING SYSTEMS WITH CAPABILITY TO CONTINUOUSLY SUPPLY DRIED RESIN

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 574 days.

(21) Appl. No.: 18/188,432

(22) Filed: Mar. 22, 2023

(65) Prior Publication Data

US 2023/0251035 A1 Aug. 10, 2023

Related U.S. Application Data

(63) Continuation-in-part of application No. 17/934,168, filed on Sep. 21, 2022, now abandoned.

(60) Provisional application No. 63/246,342, filed on Sep. 21, 2021.

(51) Int. Cl.

*F26B 21/35* (2026.01)
*B29B 13/06* (2006.01)
*F26B 25/16* (2006.01)

(52) U.S. Cl.

CPC ............ *F26B 21/35* (2026.01); *B29B 13/065* (2013.01); *F26B 25/16* (2013.01)

(58) Field of Classification Search

CPC ......... F26B 21/10; F26B 25/16; B29B 13/065
USPC ............................................................ 34/549
See application file for complete search history.

(56) References Cited

U.S. PATENT DOCUMENTS

| | | | | | |
|---|---|---|---|---|---|
| 5,598,641 | A * | 2/1997 | Kishi | E03D 11/11 110/238 |
| 5,775,004 | A * | 7/1998 | Steier | F26B 25/002 34/498 |
| 7,753,987 | B2 * | 7/2010 | Du | F27B 14/04 75/669 |
| 8,590,818 | B2 * | 11/2013 | Politi | B07B 7/086 241/62 |
| 9,863,702 | B2 * | 1/2018 | Cesar de Souza Pinto | F26B 17/00 |
| 9,950,292 | B2 * | 4/2018 | Pedace | B01D 53/0476 |
| 9,976,804 | B2 * | 5/2018 | Hanawa | F26B 5/00 |
| 11,340,014 | B2 * | 5/2022 | Trout | A61K 9/19 |
| 12,121,200 | B2 * | 10/2024 | Khazaieli | A47L 5/38 |
| 12,447,450 | B2 * | 10/2025 | Thies | B01J 2/16 |

(Continued)

FOREIGN PATENT DOCUMENTS

| | | | | |
|---|---|---|---|---|
| EP | 1600715 | A1 * | 11/2005 | B29B 9/16 |
| KR | 20090007492 | A * | 1/2009 | B29B 9/16 |

*Primary Examiner* — Stephen M Gravini

(74) *Attorney, Agent, or Firm* — Fox Rothschild LLP

(57) ABSTRACT

Systems for drying resin granulates include a first and second drying chamber each defining an internal volume configured to hold the plastic resin; a source of heated air in fluid communication with the internal; a first vacuum source in fluid communication with the internal volumes of the first and second drying chambers on a selective basis and configured to, during operation, generate a first vacuum within the internal volumes of the first and second drying chambers; and a second vacuum source in fluid communication with the internal volumes of the first and second drying chambers on a selective basis and configured to, during operation, generate a second vacuum within the internal volumes of the first and second drying chambers to draw the resin pellets into the internal volumes.

15 Claims, 11 Drawing Sheets

(56) References Cited

U.S. PATENT DOCUMENTS

| | | | | |
|---|---|---|---|---|
| 2002/0024162 | A1 * | 2/2002 | Maguire | B29B 9/16 264/102 |
| 2006/0185186 | A1 * | 8/2006 | Maguire | B01F 35/453 264/102 |
| 2023/0251035 | A1 * | 8/2023 | Maguire | F26B 17/128 34/549 |

* cited by examiner

ULTRA-2200/4400
Sequencer

| index | Station A | index | Station B |
|---|---|---|---|
| A01 | operator Start OR Auto Start command | | |
| A02 | station convey suction valve OPEN | | |
| A03 | convey pump ON | | |
| A04 | high level (via station load cell array) reached | | |
| A05 | convey pump OFF | | |
| A06 | station convey suction valve CLOSE | | |
| A07 | station hot-air inlet valve OPEN | | |
| A08 | station return air valves OPEN | | |
| A09 | blower pair ON | | |
| A10 | heater pair ON | | |
| A11 | heater pair modulation | | |
| A12 | heat time setpoint reached | | |
| A13 | heater pair OFF | | |
| A14 | blower pair OFF | | |
| A15 | station vacuum check valve OPEN | | |
| A16 | vacuum pump ON | | |
| A17 | vacuum pressure modulation | | |
| A18 | vacuum time setpoint reached | | |
| A19 | vacuum pump OFF | | |
| A20 | station pressure equalization | | |
| A21 | station vacuum valve OPEN | | |
| A22 | station dispense valve OPEN | B01 | operator Start OR Auto Start command |
| A23 | dispense | B02 | station convey suction valve OPEN |
| A23 | dispense | B03 | convey pump ON |
| A23 | dispense | B04 | high level (via station load cell array) reached |
| A23 | dispense | B05 | convey pump OFF |
| A23 | dispense | B06 | station convey suction valve CLOSE |
| A23 | dispense | B07 | station hot-air inlet valve OPEN |
| A23 | dispense | B08 | station return air valves OPEN |
| A23 | dispense | B09 | blower pair ON |
| A23 | dispense | B10 | heater pair ON |
| A23 | dispense | B11 | heater pair modulation |
| A23 | dispense | B12 | heat time setpoint reached |

FIG. 7A

ULTRA-2200/4400
Sequencer

A23 dispense
A23 dispense
A23 dispense
A23 dispense
A23 dispense
A23 dispense
A23 dispense
A23 dispense
A23 dispense
A23 dispense
A24 station low level reached
A25 station dispense valve CLOSE
A26 station vacuum valve CLOSE
A27 return to sequencer index #A02

B13 heater pair OFF
B14 blower pair OFF
B15 station vacuum check valve OPEN
B16 vacuum pump ON
B17 vacuum pressure modulation
B18 vacuum time setpoint reached
B19 vacuum pump OFF
B20 station pressure equalization
B21 station vacuum valve OPEN
B22 station dispense valve OPEN
B23 dispense
B23 dispense
B23 dispense
B23 dispense
B23 dispense
B23 dispense
B23 dispense
B23 dispense
B23 dispense
B23 dispense
B23 dispense
B23 dispense
B23 dispense
B23 dispense
B23 dispense
B23 dispense
B23 dispense
B23 dispense
B23 dispense
B23 dispense
B23 dispense
B24 return to sequencer index #B02
B25 station dispense valve CLOSE
B26 station vacuum valve CLOSE
B27 return to sequencer index #B02

FIG. 7B

RESIN DRYING SYSTEMS WITH CAPABILITY TO CONTINUOUSLY SUPPLY DRIED RESIN

BACKGROUND

Resin dryers commonly are used in the plastics industry. Resin dryers remove moisture from plastic resin granulates, such as resin pellets, before the resin pellets are molded or otherwise processed to produce plastic products. Such moisture, if present in the resin pellets during processing, can result in cracks, voids, and other flaws in the finished plastic product.

The resin granulates may be dried in batches. For example, a predetermined quantity of resin granulates may be loaded into the dryer. The resin granulates are then dried. Upon the conclusion of the drying process, the resin granulates are discharged from the dryer and are available for use in a downstream process such as the fabrication of plastic parts by molding. Because the resin granulates are not available while the drying process is underway, the dryer cannot produce a continuous, uninterrupted supply of dried resin granulates for the downstream process.

SUMMARY

In one aspect of the disclosed technology, a system for drying resin granulates includes a first and second drying chamber each defining an internal volume configured to hold the plastic resin; a source of heated air in fluid communication with the internal volumes of the first and second drying chambers on a selective basis and configured to, during operation, provide heated air to the internal volumes of the first and second drying chambers; a first vacuum source in fluid communication with the internal volumes of the first and second drying chambers on a selective basis and configured to, during operation, generate a first vacuum within the internal volumes of the first and second drying chambers; a second vacuum source in fluid communication with the internal volumes of the first and second drying chambers on a selective basis and configured to, during operation, generate a second vacuum within the internal volumes of the first and second drying chambers to draw the resin pellets into the internal volumes; a discharge valve configured to facilitate discharge of the resin granulates from the internal volumes of the first and second drying chambers on a selective basis; and a controller configured to control the operation of the source of heated air, the first and second vacuum sources, and the discharge valve so that the resin granulates in the first chamber are subjected to at least one of the heated air and the first and second vacuums while the resin granulates are being discharged from the internal volume of the second drying chamber.

In another aspect of the disclosed technology, the controller is further configured to control the operation of the source of heated air, the first and second vacuum sources, and the discharge valve so that the resin granulates in the second chamber are subjected to at least one of the heated air and the first and second vacuums while the resin granulates are being discharged from the internal volume of the first drying chamber.

BRIEF DESCRIPTION OF THE DRAWINGS

The following drawings are illustrative of particular embodiments of the present disclosure and do not limit the scope of the present disclosure. The drawings are not to scale and are intended for use in conjunction with the explanations provided herein. Embodiments of the present disclosure will hereinafter be described in conjunction with the appended drawings.

FIGS. 7A and 7B are a tabular depiction of the operating sequence depicted in FIG. 6A.

WRITTEN DESCRIPTION

Figure 1:
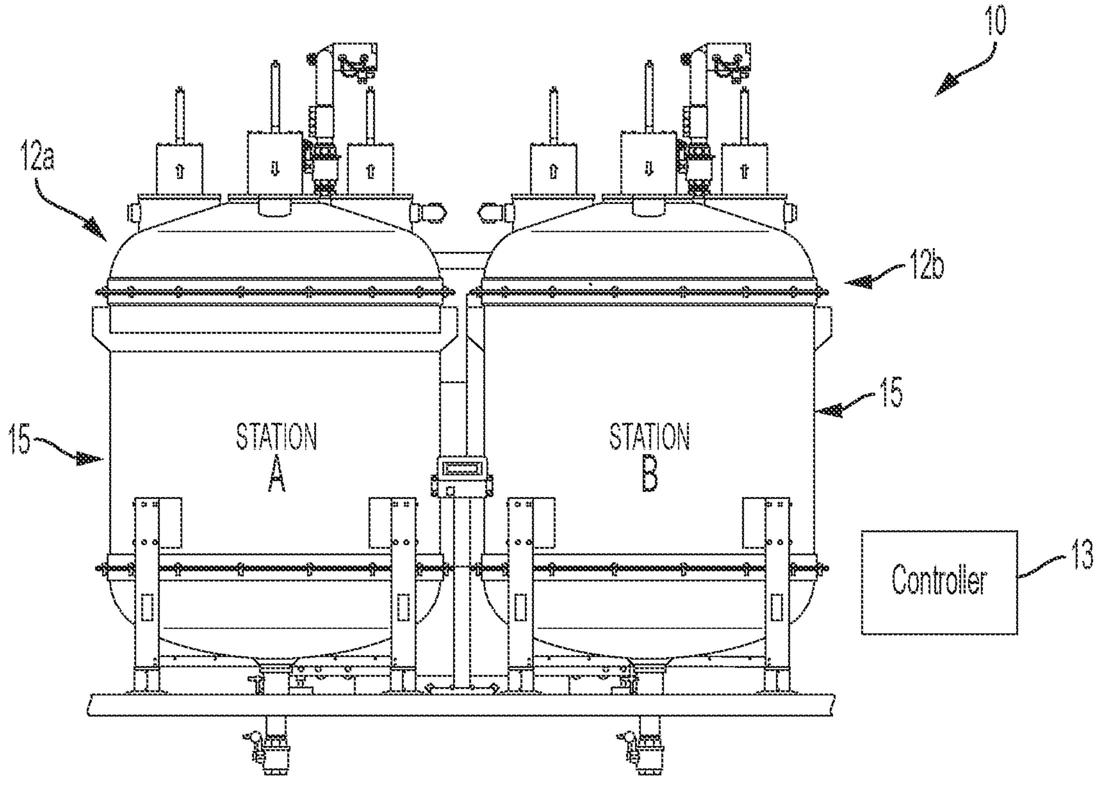
FIG. 1 is a side view of a first and a second drying station of a resin drying system.

The inventive concepts are described with reference to the attached figures, wherein like reference numerals represent like parts and assemblies throughout the several views. The figures are not drawn to scale and are provided merely to illustrate the instant inventive concepts. The figures do not limit the scope of the present disclosure or the appended claims. Several aspects of the inventive concepts are described below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operation are not shown in detail to avoid obscuring the inventive concepts.

Figure 5:
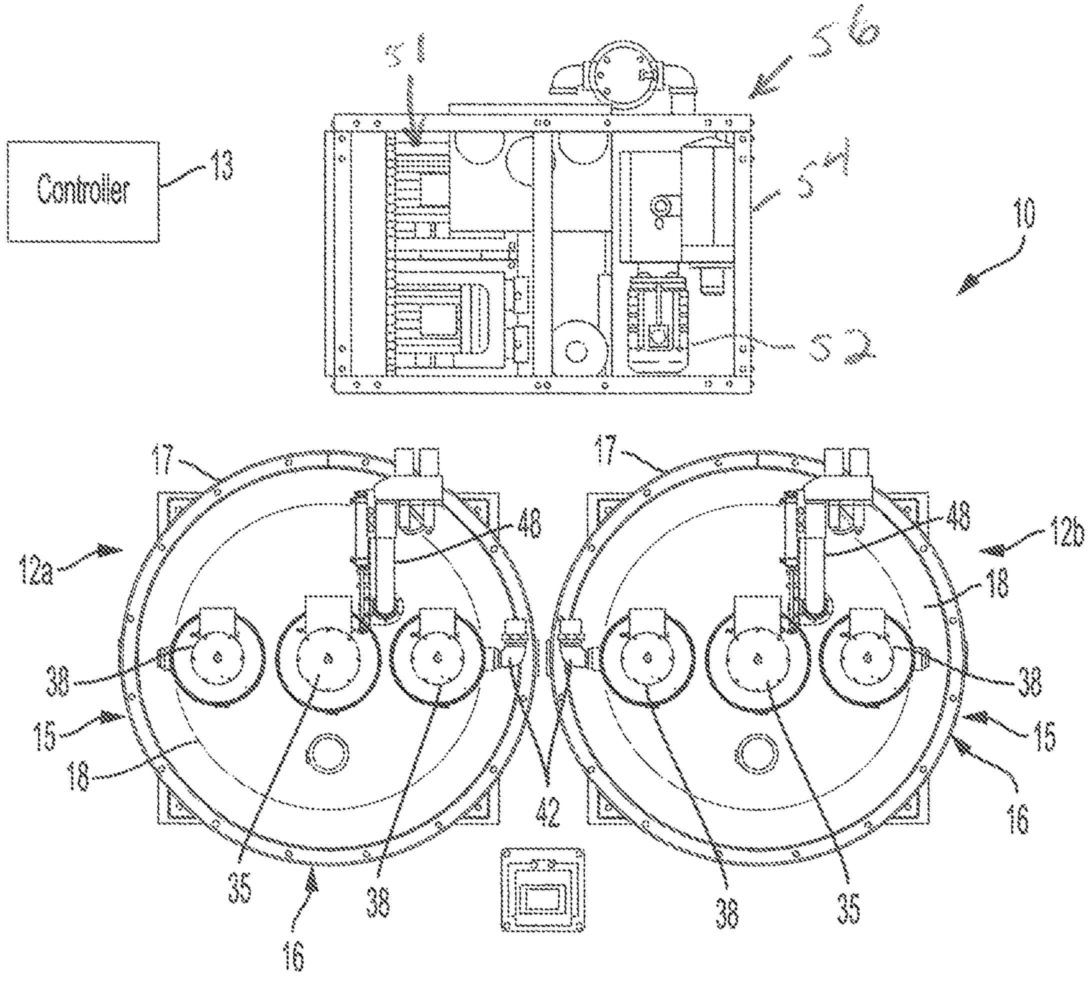
FIG. 5 is a top view of the drying station shown in FIGS. 1-4.
Figure 8:
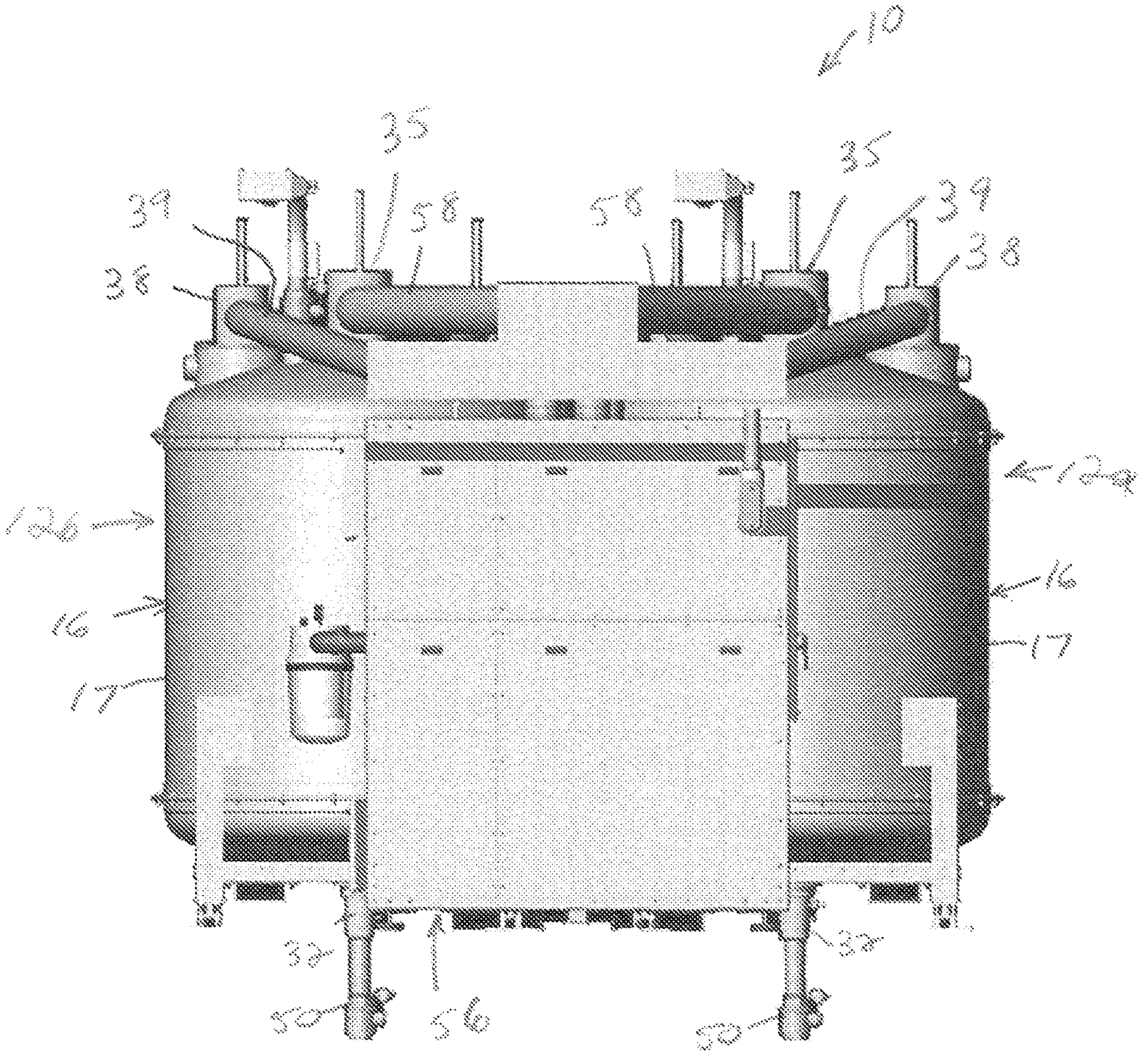
FIG. 8 is a rear view of the system shown in FIGS. 1-5.
Figure 9:
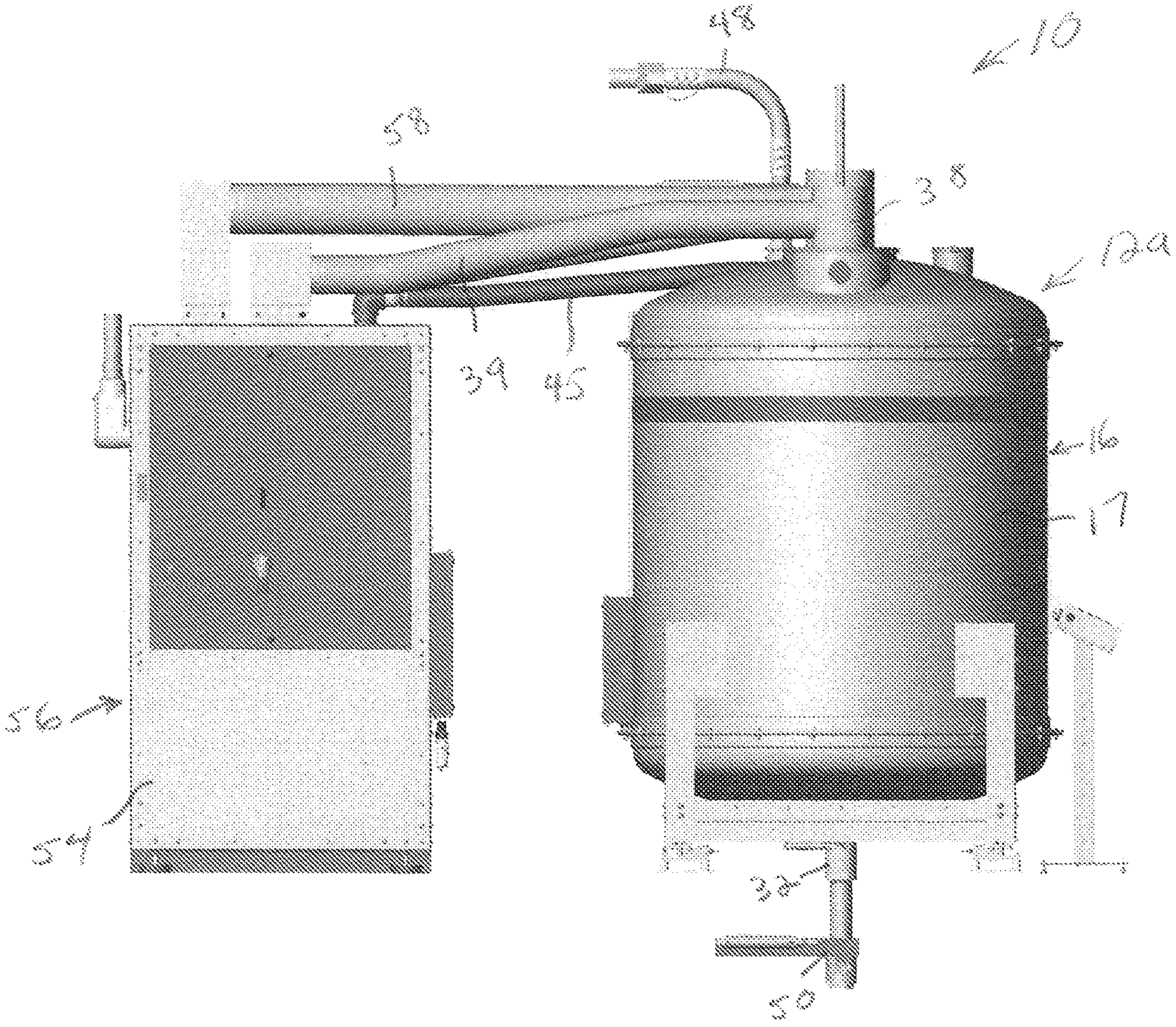
FIG. 9 is a side view of the system shown in FIGS. 1-5 and 8
Figure 10:
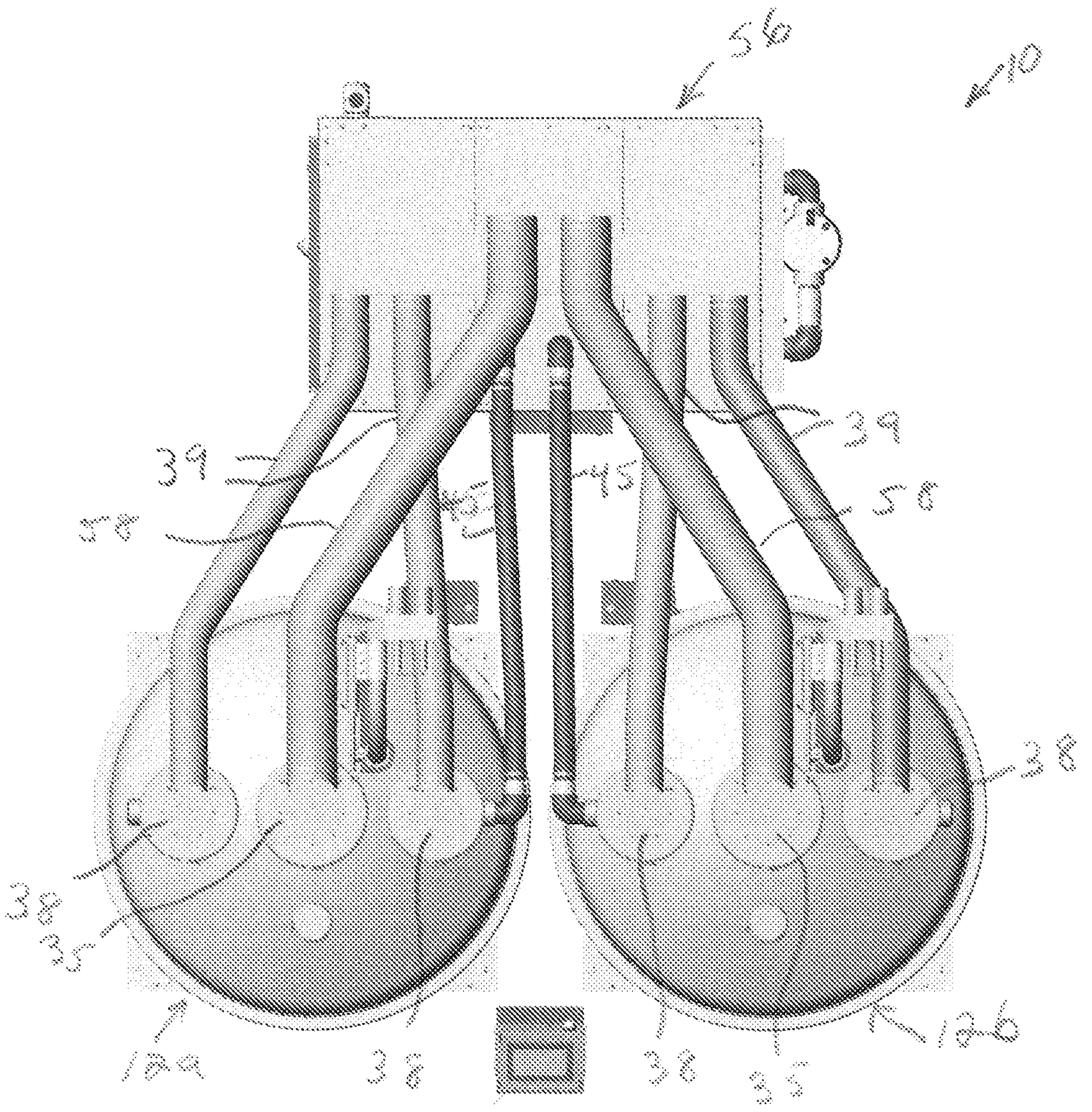
FIG. 10 is a top view of the resin drying system shown in FIGS. 1-5, 8, and 9.
Figure 11:
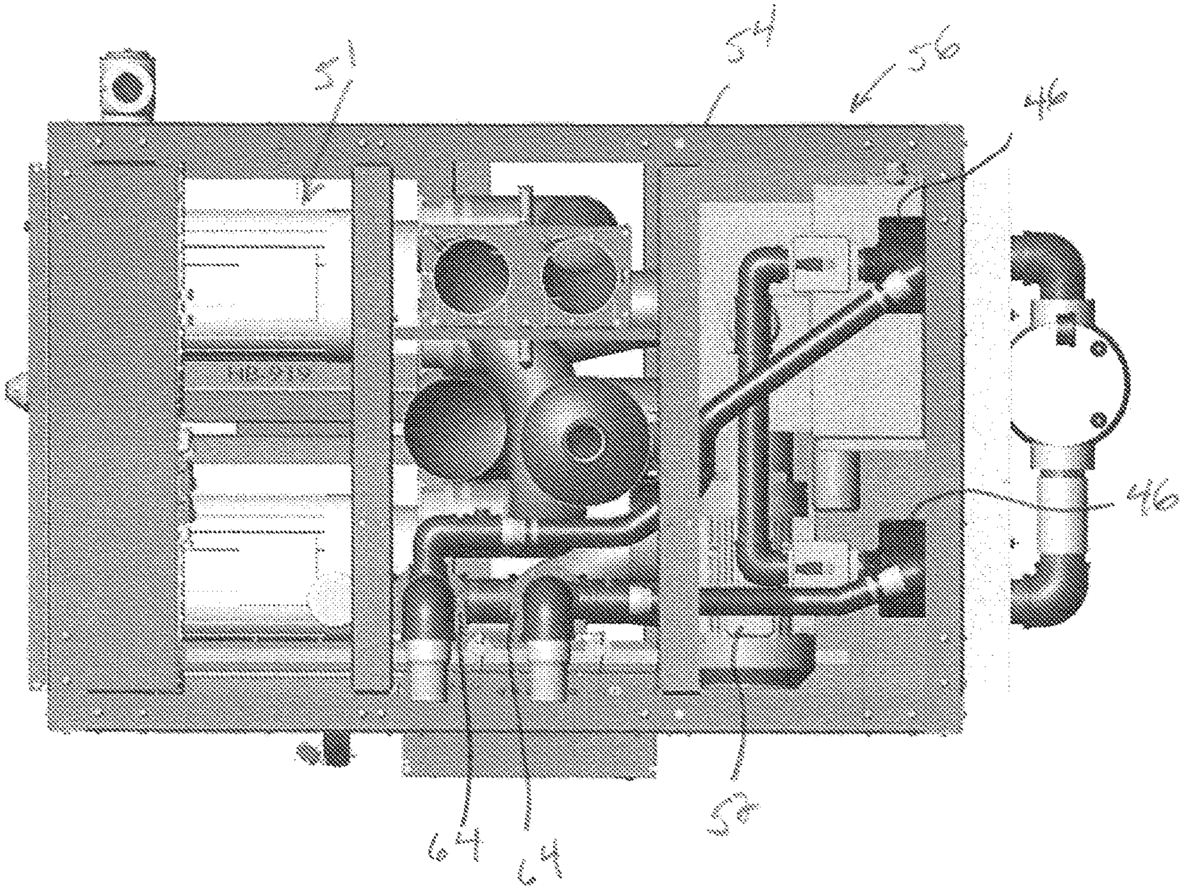
FIG. 11 is a top view of a back-end unit of the system shown in FIGS. 1-5 and 8-10.

The figures depict a resin drying system 10. The system 10 is configured to dry plastic resin granulates such as plastic resin pellets. The plastic resin pellets can be, for example, PET resin. The system 10 comprises a first station 12*a*, and a substantially identical second station 12*b*, as shown in FIGS. 1, 5, and 8-10. The system 10 also includes a controller 13, depicted diagrammatically in FIG. 5. The system 10 also includes a source of heated air 51 and a drying vacuum pump 52, depicted in FIGS. 5 and 11, and a convey vacuum pump (not shown). The controller 13, the source of heated air 51, the drying vacuum pump 52, the convey vacuum pump, and their associated valving can be arranged in a common housing 54, as shown in FIGS. 5, 10, and 11, and together form a back-end unit 56 that services both of the first and second stations 12*a*, 12*b*.

As discussed below, each of the first and second stations 12*a*, 12*b* can operated on a drying cycle in which the resin pellets are loaded into the first or second station 12, 12*b* in a loading phase. A heating phase, in which heated air is supplied to the interior of the first or second station 12*a*, 12*b* to heat and partially dry the resin pellets, follows the loading phase. A vacuum drying phase, in which the interior of the first or second station 12*a*, 12*b* is subjected to a vacuum to further dry the resin pellets, follows the heating phase. The dried resin pellets subsequently are dispensed from the first or second stations 12*a*, 12*b* in a dispensing phase.

Figure 6A:
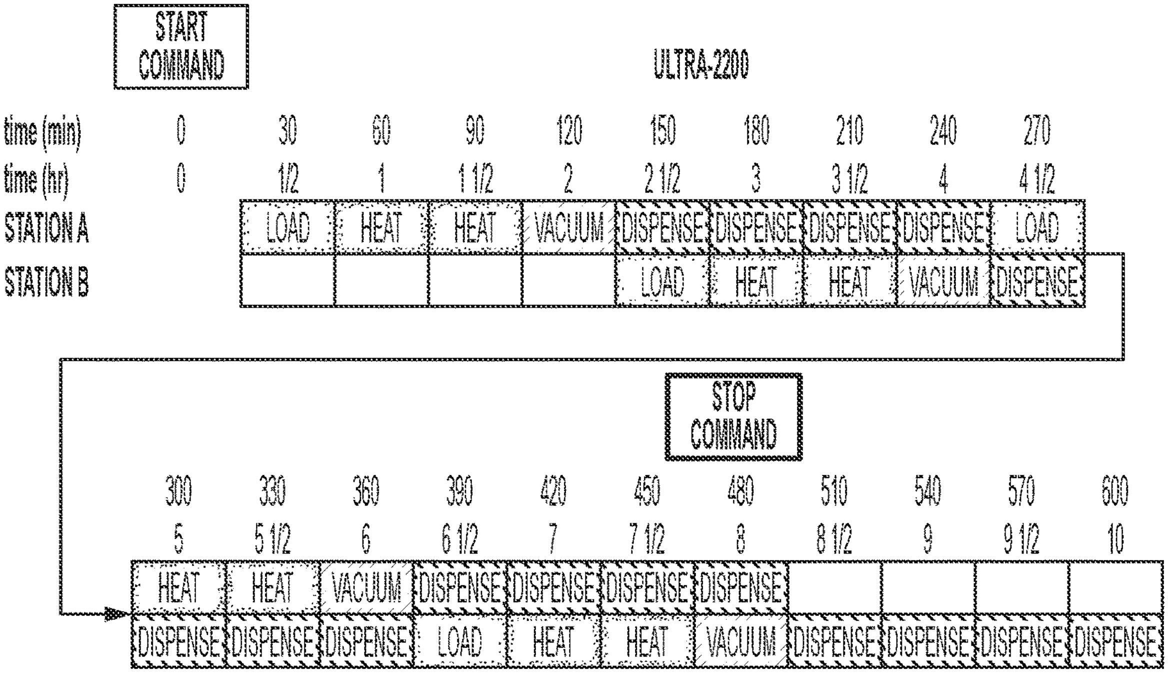
FIG. 6A is a chart depicting an operating sequence of the resin drying system shown in FIGS. 1-5.

The first and second stations 12*a*, 12*b* can operate in a coordinated manner, in accordance with the overall drying cycle depicted in FIG. 6A. As discussed below, under this this cycle, the operating states of the first and second stations 12*a*, 12*b* are offset so that at any given time after the first station 12*a* completed its initial vacuum drying phase, one of the first and second stations 12*a*, 12*b* is dispensing while the other is being loaded, or is drying. Also, each of the first and second stations 12*a*, 12*b* can handle all phases of the drying cycle: loading, heating, vacuum application, and retention. Thus, dried resin pellets can be supplied continuously to the downstream process in which the resin pellets are used, with no interruptions in the supply; and one source of heated air 51, one drying vacuum pump 52, and one convey vacuum pump can be used to support the operation of both of the first and second stations 12*a*, 12*b*.

The system 10 is not limited to the particular drying cycles disclosed herein; the system 10 can be configured to operate on other drying cycles.

The first station 12*a* and the second station 12*b* each include a drying chamber 15, as shown in FIGS. 1, 5, and 8-10. Referring to FIG. 2, the drying chamber 15 comprises an outer pressure vessel 16. The outer pressure vessel 16 includes a cylindrical tank body 17, an upper tank head 18, and a lower tank head 20. The upper tank head 18 and the lower tank head 20 are connected to the respective upper and lower ends of the tank body 17 by a suitable means such as fasteners. The outer pressure vessel 16 is supported by four legs 21. A load cell 22 is mounted on each leg 21. The load cells 22 are communicatively coupled to the controller 13. The controller 13 is configured to determine the quantity of resin pellets within the first station 12*a*, by weight, based on the outputs of the load cells 22.

The drying chamber 15 also comprises an inner liner 23 positioned within the interior volume of the outer pressure vessel 16. The inner liner 23 receives pellets of plastic resin, such as PET, to be dried; and holds the resin pellets during the drying process. The inner liner 23 can be formed, for example, from 304 stainless steel. The inner liner 23 is suspended from the upper tank head 18 of the outer pressure vessel 16. The inner liner 23 has a substantially cylindrical upper portion 24, and a substantially conical lower portion 26 connected to the upper portion 24 by a suitable means such as welding. An outlet 28 is formed at the bottom of the lower portion 26. The outlet 28 extends through the lower tank head 20 of the outer pressure vessel 16, and provides an exit for the resin pellets from the drying chamber 15.

Figure 2:
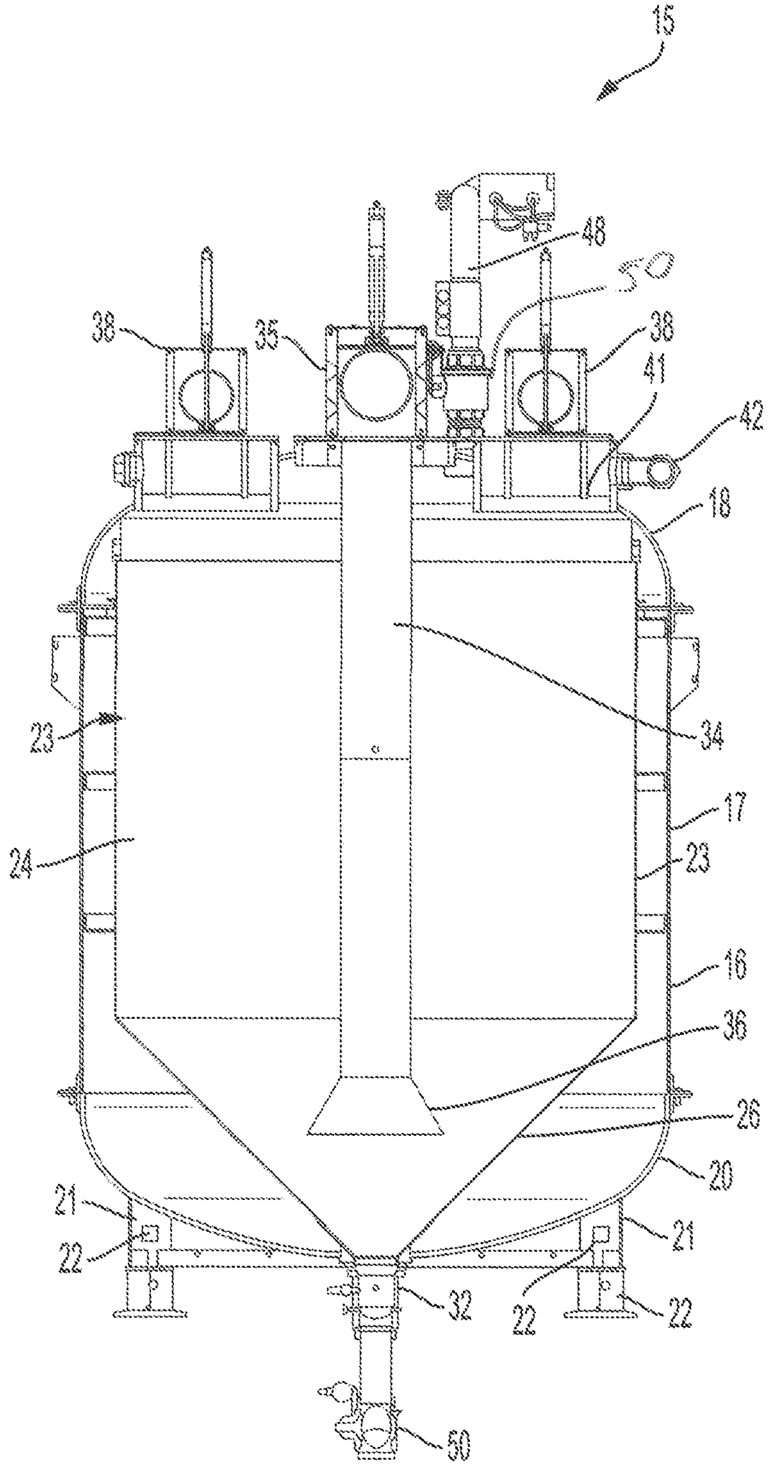
FIG. 2 is a side view of an interior of the first drying station shown in FIG. 1.
Figure 3:
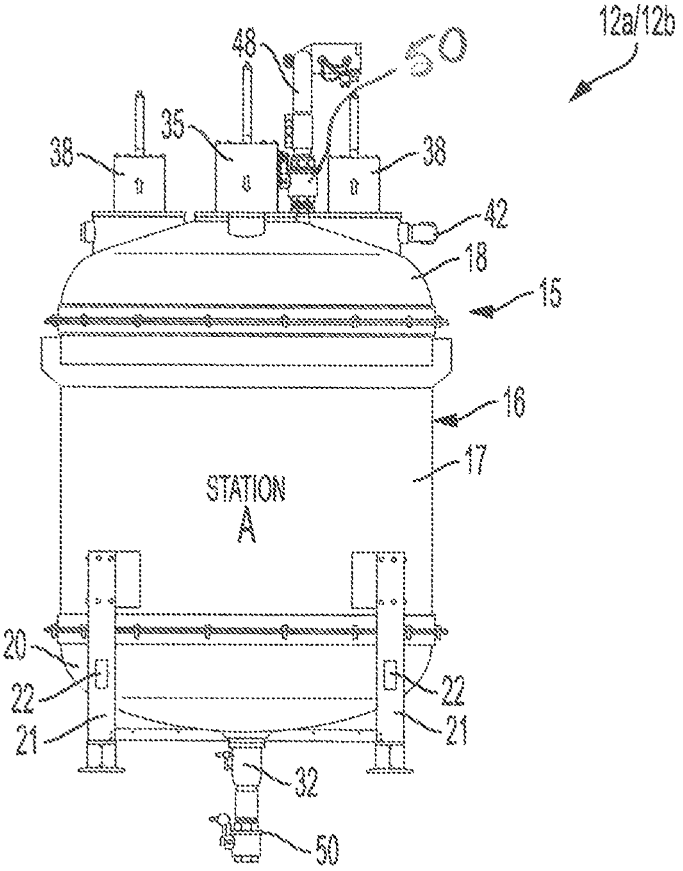
FIG. 3 is a side view of the first drying station shown in FIG. 2.
Figure 4:
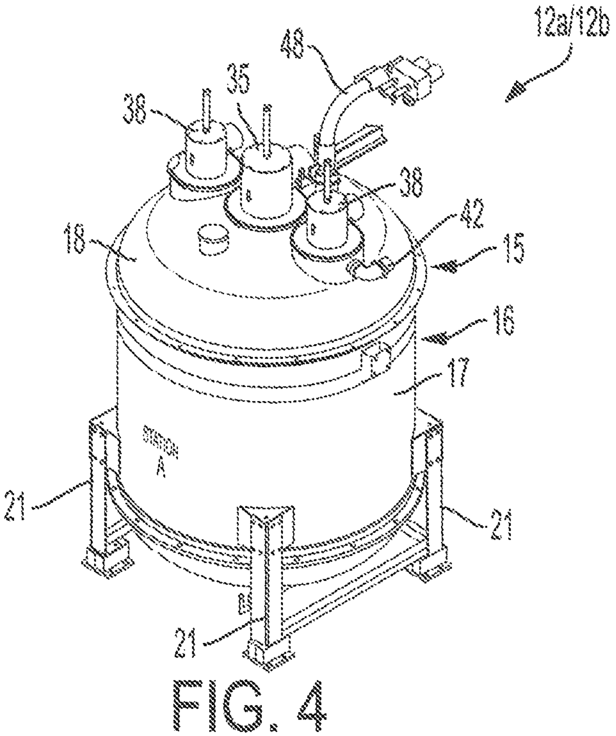
FIG. 4 is a top perspective view of the first drying station shown in FIGS. 2 and 3.

Referring to FIGS. 1-3, the drying chamber 15 further includes a material valve 32. The material valve 32 is mounted on the lower tank head 20, and is fluid communication with the outlet 28 and the interior volume of the inner liner 23. The material valve 32 is communicatively coupled to the controller 13, and can be opened and closed in response to inputs generated by, and received from the controller 13. The material valve 32, when opened, permits the resin pellets to exit the drying chamber 15. When closed, the material valve 32 prevents the resin pellets from exiting the drying chamber 15, and forms an airtight seal between the interior and exterior of the drying chamber 15.

Referring to FIGS. 1-5, the drying chamber 15 also includes a hot air inlet tube 34; and a hot air inlet valve 35. The hot air inlet valve 35 is mounted on the upper end, or inlet, of the hot air inlet tube 34, and is communicatively coupled to the controller 13. The hot air valve 35 is connected to the source of heated air 51 by hosing or ducting 58. The ducting 58 is depicted in FIGS. 8-10. The ducting 58 is not shown in FIG. 5, for clarity of illustration. The hot air inlet tube 34 is suspended from, and extends through a port formed in the upper tank head 18. A hot air diffuser cone 36 is connected to a lower end of the hot air inlet tube 34. The hot air inlet tube 34 extends downward through the upper portion 24 of the inner liner 23; the hot air diffuser cone 36 is located within the lower portion 26 of the inner liner 23, as shown in FIG. 2.

The source of heated air 51 can include a heater, and one or more blowers that heat, modulate, and circulate the process air that heats, and partially dries the resin pellets in the first and second stations 12*a*, 12*b*. During heating of the resin pellets in the first or second station 12*a*, 12*b*, the hot air valve 35 for that particular station 12*a*, 12*b* is opened, and remains open, in response to inputs from the controller 13. This allows heated air from the heated air source 51 to enter, and travel downward though the hot air inlet tube 34. The heated air enters the hot air diffuser cone 36, and then flows into the interior volume of the inner liner 23. The heated air subsequently flows upward through the inner liner 23, heating the resin pellets resident in the inner liner 23. The heating of the resin pellets removes moisture from the resin pellets. When the hot air valve 35 is closed, the interior volume of the drying chamber 14 is isolated from the source of heated air 51.

The drying chamber 15 further includes two return air valves 38 mounted on the upper tank head 18 and communicatively coupled to the controller 13, as shown in FIGS. 1-5. Each return air valve 38 is connected to the source of heated air 51 by hosing or ducting 39. The ducting 39 is depicted in FIGS. 8-10. The ducting 39 is not shown in FIG. 5, for clarity of illustration. Each return air valve 38 is in fluid communication with the interior volume of the drying chamber 15, via a corresponding port on the upper tank head 18. During heating of the resin pellets in the first or second station 12*a*, 12*b*, the return air valves 38 for that particular station 12*a*, 12*b* are opened, and remain open, in response to inputs from the controller 13. This allows the air that has passed over and heated the resin pellets to exit the interior volume of the drying chamber 15. After exiting the drying chamber 15 by way of the return air valves 38, the air enters the ducting 39 associated with the first or second station 12*a*, 12*b*, and is recirculated to the source of heated air 51. The air is then reheated and recirculated to the drying chamber 15 by way of the ducting 58. The vacuum check valve 46, the convey suction valve 50, and a convey airlock 64 for the station 12*a* or 12*b* remain closed during the drying process, so that the drying vacuum pump 44 and the conveying vacuum pump remain isolated from the drying chamber 15.

The heated air is supplied to the hot air inlet tube 34 via the hot air valve 35, until the controller 13 determines that a heat time setpoint has been reached. When the heat-time setpoint is reached, the controller 13 generates inputs that cause the hot air valve 35 and the return air valves 38 to close, isolating the interior volume of the drying chamber 15 from the ducting 58, 39 and the source of heated air 51.

Referring to FIGS. 1-5, the drying chamber 15 also includes a suction port 42 located on the upper tank head 18. The suction port 42 is connected to the drying vacuum pump 44 via tubing 45 and a vacuum check valve 46. The tubing 45 is depicted in FIGS. 9 and 10. The tubing 45 is not shown in FIG. 5, for clarity of illustration. The vacuum check valve 46 is shown in FIG. 11.

The vacuum drying phase of drying cycle follows the heating phase, and is conducted without any heated air being supplied to the drying camber 15. At the start of the vacuum drying phase in the first or second station 12*a*, 12*b*, the vacuum check valve 46 for that particular station 12*a*, 12*b* is opened, and the drying vacuum pump 44 is activated in response to inputs from the controller 13. The hot air valve 35, the return air valves 38, the convey suction valve 50, and the convey airlock 64 for the station 12*a* or 12*b* remain closed during the vacuum drying process, so that the source of heated air 51 and the conveying vacuum pump remain isolated from the drying chamber 15.

The drying vacuum pump 44 draws, and modulates a vacuum in the interior volume of the drying chamber 15 by way of the suction port 42, and remains activated until the controller 13 determines that a vacuum time setpoint has been reached. When the vacuum time setpoint is reached, the controller 13 generates inputs that cause the drying vacuum pump 44 to deactivate and the vacuum check valve 46 to close. Subjecting the resin pellets to a vacuum during the vacuum drying phase causes additional moisture to be removed from the resin pellets.

During the loading phase of the drying cycle, the “wet” resin pellets initially are conveyed to the drying chamber 15 from a central supply or a central supply line via a wet material line 48 connected to a port on the upper tank head 18, a convey suction valve 50 depicted in FIG. 2, and the convey vacuum pump (not shown). At the start of the loading phase for the first or second station 12*a*, 12*b*, the convey suction valve 50 and the convey airlock 64 for that particular station 12*a*, 12*b* are opened in response to inputs from the controller 13, to place the convey vacuum pump in fluid communication with the interior volume of the drying chamber 15. The hot air valve 35, the return air valves 38, and the vacuum check valve 46 remain closed, so that the source of heated air 51 and the drying vacuum pump 52 remain isolated from the drying chamber 15.

The convey vacuum pump is then activated, causing the wet resin pellets to be drawn from a hopper or other storage reservoir, conveyed to the interior of the inner liner 23 via the wet material line 48, and deposited into the inner liner 23. The convey vacuum pump remains activated, and the convey suction valve 50 and the convey airlock 64 remain open until the controller 13 determines that the resin pellets have reached a predetermined “high” level in the drying chamber 15. The controller 13 determines when the resin pellets reach the high level by monitoring the overall weight of the drying chamber 15 and its contents based on the outputs of the load cells 22. When the controller 13 determines that the resin pellets have reached the high level, the controller 13 generates inputs that cause the convey pump to deactivate, and the convey suction valve 50 and the convey airlock 64 to close. The first or second station 12*a*, 12*b* at this point is fully loaded, and is ready to begin the heating phase of the drying cycle.

The drying chamber 15 further includes a vacuum valve 50, shown in FIG. 2, communicatively coupled to the controller 13 and fluidly coupled to a vacuum source (not shown). The vacuum valve 50 is located directly downstream of the material valve 32. After the vacuum drying phase of the drying cycle has been completed and the vacuum check valve 46 has been closed, the dried resin pellets are dispensed from the drying chamber 15 via the material valve 32 and the vacuum valve 50. Specifically, at the start of the dispense phase, the vacuum valve 50 is opened, followed by the opening of the material valve 32, in response to inputs from the controller 13. The vacuum valve 50 and the material valve 32 are maintained in the open state for a sufficient period of time to permit all of the resin pellets to be discharged from the drying chamber 15 by way of the material valve 32. Once the controller 13 determines that the discharge period has elapsed, i.e., once the resin pellets have reached a “low” level in the drying chamber 15 based on the amount of time that has elapsed after the opening of the vacuum valve 50 and the material valve 32, the controller 13 generates inputs that cause the vacuum valve 50 and the material valve 32 to close. Alternatively, the controller 13 can monitor the weight of the drying chamber 15 and its contents, and can determine the end of the discharge phase based on the measured change in weight of the drying chamber 15 and its contents. At this point, the discharge phase is complete and the first station 12*a* or the second station 12*b* is ready to begin another drying cycle, beginning with the loading of a new batch of “wet” resin particles into the drying chamber 15.

The first and second stations 12*a*, 12*b* can be operated independently of each other. Alternatively, as shown for example in FIG. 6A, the first and second stations 12*a*, 12*b* can be operated simultaneously, in a coordinated manner, such that the loading, heating, vacuum drying, and discharge phases of the first station 12*a* do not overlap with the respective loading, heating, vacuum drying, and discharge phases of the second station 12*b*, i.e., the operating states of the first and second stations 12*a*, 12*b* are offset so that at any given time after the initial vacuum drying phase of the first station 12*a* has been completed, one of the first and second stations 12*a*, 12*b* is dispensing while the other is being loaded or is drying, thereby facilitating a continuous supply of dried resin particles to the downstream process in which resin particles are used, with no interruptions. Thus, one source of heated air 51, one vacuum pump 52, and one convey pump can be used to support the operation of both of the first and second stations 12*a*, 12*b* while the first and second stations 12*a*, 12*b*, in combination, continually supply dried resin particles to the downstream process. Also, having all four of the drying functions (loading, heating, vacuum application, and retention) combined into one multi-function chamber system 10 can allow for a relatively compact overall system footprint, with a relatively low ceiling height requirement. Also, cold restarts can be performed simply by starting the system 10, without a need to remove leftover resin pellets from the first or the second stations 12*a*, 12*b*.

FIGS. 6A, 7A, and 7B depict the sequence and timing of the various phases of the drying cycles for the first station 12*a* (“Station A”) and the second station 12*b* (“Station B”) when the first and second stations 12*a*, 12*b* are operated in the coordinated manner noted above. FIG. 7 depicts the sequence and timing of the various phases of the drying cycles when three identical stations (“Station A,” “Station B,” and “Station C”) similarly are used in a coordinated manner.

Referring to the simultaneous operation of the first and second stations 12*a*, 12*b* as depicted in FIGS. 6A, 7A, and 7B, the cycle begins with the loading phase for the first station 12*a*, followed by the heating and vacuum drying phases for the first station 12*a* as described above. Upon completion of the vacuum drying phase, the dried resin pellets are dispensed from the first station 12*a* in the above-described manner.

The second station 12*b* is inactive as the first station 12*a* is cycled through the loading, heating, and vacuum drying phases. The loading phase for the second station 12*b* commences as the vacuum drying phase for the first station 12*a* is completed. The heating and vacuum drying phases for the second station 12*b* follow the loading phase. The loading, heating, and vacuum drying phases for the second station 12*b* occur simultaneously with the dispensing phase for the first station 12*a*. The dispensing phase for the second station 12*b* begins upon completion of the vacuum drying cycle for the second station 12*b*.

As shown in FIG. 6A, a second drying cycle for the first station 12*a* can commence upon completion of the dispense cycle for the first station 12*a* (which coincides with the completion of the initial vacuum drying phase for the second station 12*b*). The loading, heating, and vacuum drying phases of the second drying cycle of the first station 12 can occur simultaneously with the initial dispense cycle for the second station 12*b*.

As also shown in FIG. 6A, a second drying cycle for the second station 12*b* can commence upon completion of the dispense phase of the initial drying cycle of the second station 12*b* (which coincides with the completion of the vacuum drying phase of the second drying cycle of the first station 12*a*). The loading, heating, and vacuum drying phases of the second drying cycle of the second station 12*b* can occur simultaneously with the dispense phase of the second drying cycle of the first station 12*a*. The dispense phase of the second drying cycle of the second station 12*b* commences upon completion of the vacuum drying phase of the second drying cycle of the second station 12*b*.

Because the loading, heating, vacuum drying, and dispensing phases for the first station 12*a* are offset from, i.e., do not occur simultaneously with, the respective loading, heating, vacuum drying, and dispensing phases for the second station 12*b*, the one source of heated air 50, one drying vacuum pump 52, and one convey vacuum pump can be used to service both the first and second stations 12*a*, 12*b*, and the dried resin pellets can be provided to the downstream process on a continuous, uninterrupted basis once the initial vacuum drying phase for the first station 12*a* has been completed.

FIGS. 6A, 7A, and 7B show the first and second stations 12*a*, 12*b* each cycling thorough two respective drying cycles. The drying cycles can be repeated more than two times, if desired.

Figure 6B:
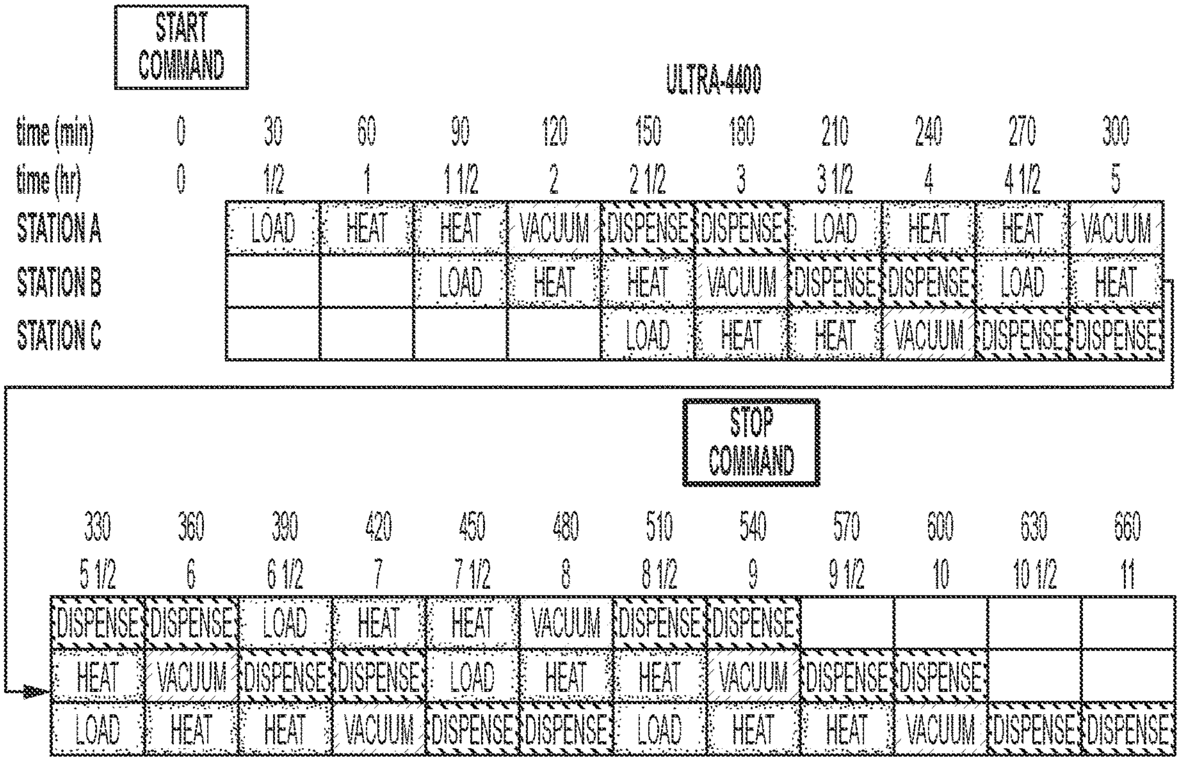
FIG. 6B is a chart depicting an operating sequence of an alternative embodiment of the resin drying system shown in FIGS. 1-5.

Referring to the simultaneous operation of the first and second stations 12*a*, 12*b* and a third station 12*c* (station C) as depicted in FIG. 6B, the overall cycle begins with the loading phase for the first station 12*a*, followed by the heating and vacuum drying phases for the first station 12*a* as described above. Upon completion of the vacuum drying phase, the dried resin granulates are dispensed from the first station 12*a* in the above-described manner.

The second station 12*b* is inactive as the first station 12*a* is cycled initially through the loading phase, and one-half of the heating phase. The loading phase for the second station 12*b* commences as the second half of the heating phase for the first station 12*a* is commenced. The second half of the heating phase and vacuum drying phase for the second station 12*b* occur simultaneously with the dispense phase of the first station 12.

Referring still to FIG. 6B, the third station 12*c* is inactive as the first station 12*a* is cycled initially through the loading phase, the heating phase, and the vacuum drying phase; and while the second station 12*b* is cycled initially through the loading phase, and half of the heating phase. The loading phase for the third station 12*b* commences as the dispense phase for the first station 12*a* is commenced, and as the second half of the heating phase for the second station 12*b* is commenced. The heating and dispensing phases for the third station 12*c* follow the loading phase.

The above-noted cycling of the first, second, and third stations can be repeated multiple times as shown in FIG. 6B.

As can be seen in FIG. 6B, due to the sequence in which the first, second, and third stations 12*a*, 12*b*, 12*c* are cycled, the respective loading, heating, vacuum drying, and dispensing phases for the first, second and third stations 12*a*, 12*b*, 12*c* are offset from each other. The one source of heated air 50, one drying vacuum pump 52, and one convey vacuum pump, therefore, can be used to service each of the first, second, and third stations 12*a*, 12*b*, 12*c*; and the dried resin pellets can be provided to the downstream process on a continuous, uninterrupted basis once the initial vacuum drying phase for the first station 12*a* has been completed.

The controller 13 may comprise a central processing unit (CPU), a system bus, a memory connected to and accessible by other portions of computing device through system bus, a system interface, and hardware entities connected to system bus. The system interface is configured to facilitate wired or wireless communications to and from external devices, e.g., network nodes such as access points, etc.

At least some of the hardware entities perform actions involving access to and use of memory, which can be a Radom Access Memory ("RAM"), a disk driver and/or a Compact Disc Read Only Memory ("CD-ROM"). Hardware entities can include a disk drive unit comprising a computer-readable storage medium on which is stored one or more sets of instructions (e.g., software code) configured to implement one or more of the methodologies, procedures, or functions described herein. The instructions can also reside, completely or at least partially, within the memory and/or within the CPU 606 during execution thereof by the computing device. The memory and the CPU also can constitute machine-readable media. The term "machine-readable media," as used herein, refers to a single medium or multiple media (e.g., a centralized or distributed database, and/or associated caches and servers) that store the one or more sets of instructions. The term "machine-readable media," as used herein, also refers to any medium that is capable of storing, encoding or carrying a set of instructions for execution by the computing device and that cause the computing device to perform any one or more of the logical operations disclosed herein.

The controller 13 can have other configurations that that disclosed above.

I claim:

1. A system for drying resin granulates, comprising:

a first and second drying chamber each defining an internal volume configured to hold the resin granulates;

a source of heated air in fluid communication with the internal volume of the first drying chamber and the internal volume of the second drying chamber on a selective basis and configured to, during operation, provide heated air to the internal volume of the first drying chamber and the internal volume of the second drying chamber;

a first vacuum source in fluid communication with the internal volume of the first drying chamber and the internal volume of the second drying chamber on a selective basis and configured to, during operation, generate a first vacuum within the internal volume of the first drying chamber and the internal volume of the second drying chamber;

a second vacuum source in fluid communication with the internal volume of the first drying chamber and the internal volume of the second drying chamber on a selective basis and configured to, during operation, generate a second vacuum within the internal volume of the first drying chamber and the internal volume of the second drying chamber to draw the resin granulates into the internal volume of the first drying chamber and the internal volume of the second drying chamber;

a first material valve configured to facilitate discharge of the resin granulates from the internal volume of the first drying chamber on a selective basis;

a second material valve configured to facilitate discharge of the resin granulates from the internal volume of the second drying chamber on a selective basis; and a controller configured to control the system so that the resin granulates in the internal volume of the first drying chamber are subjected to at least one of the heated air and the first and second vacuums while the resin granulates are being discharged from the internal volume of the second drying chamber.

2. The system of claim 1, wherein the controller is further configured to control the operation of the system so that the resin granulates in the internal volume of the second drying chamber are subjected to at least one of the heated air and the first and second vacuums while the resin granulates are being discharged from the internal volume of the first drying chamber.

3. The system of claim 2, further comprising:

a first drying station, the first drying station including:

the first drying chamber, the first material valve, the first material valve communicatively coupled to the controller and being in fluid communication with the interior volume of the second drying chamber, a first hot air inlet valve communicatively coupled to the controller and in fluid communication with the source of heated air and the interior volume of the first drying chamber, the first hot air inlet valve configured to place the source of heated air in fluid communication with the interior volume of the first drying chamber on a selective basis, a first vacuum valve communicatively coupled to the controller and in fluid communication with the first vacuum source and the interior volume of the first drying chamber, the first vacuum valve configured to place the first vacuum source in fluid communication with the interior volume of the first drying chamber on a selective basis, and a first convey suction valve communicatively coupled to the controller and in fluid communication with the second vacuum source and the interior volume of the first drying chamber, the first convey suction valve configured to place the second vacuum source in fluid communication with the interior volume of the first drying chamber on a selective basis;

a second drying station, the second drying station including:

the second drying chamber, the second material valve, the second material valve communicatively coupled to the controller and being in fluid communication with the interior volume of the second drying chamber, a second hot air inlet valve communicatively coupled to the controller and in fluid communication with the source of heated air and the interior volume of the second drying chamber, the second hot air inlet valve configured to direct the heated process air to the interior volume of the second drying chamber on a selective basis, a second vacuum valve communicatively coupled to the controller and in fluid communication with the first vacuum source and the interior volume of the second drying chamber, the second vacuum valve configured to place the first vacuum source in fluid communication with the interior volume of the second drying chamber on a selective basis, and a second convey suction valve communicatively coupled to the controller and in fluid communication with the second vacuum source and the interior volume of the second drying chamber, the second convey suction valve configured to place the second vacuum source in fluid communication with the interior volume of the second drying chamber on a selective basis;

wherein the controller is configured to control the first hot air inlet valve, the first vacuum valve, the first convey suction valve, and the first material valve so that the resin granulates in the internal volume of the first chamber are subjected to at least one of the heated air and the first and second vacuums while the resin granulates in the second chamber are being discharged from the internal volume of the second drying chamber.

4. The system of claim 3, wherein the controller is configured to control the second hot air inlet valve, the second vacuum valve, the second convey suction valve, and the second material valve so that the resin granulates in the internal volume of the second chamber are subjected to at least one of the heated air and the first and second vacuums while the resin granulates in the internal volume of the first drying chamber are being discharged from the internal volume of the first drying chamber.

5. The system of claim 3, wherein the controller is configured to control the first and second hot air inlet valves, the first and second vacuum valves, the first and second convey suction valves, and the first and second material valves so that the resin granulates are discharged from the system on a substantially continuous basis.

6. The system of claim 3, wherein:

the internal volume of the first drying chamber and the internal volume of the second drying chamber are subjected to the second vacuum during respective loading phases within the first drying chamber and the second drying chamber;

the hot air is supplied to the internal volume of the first drying chamber and the internal volume of the second drying chamber during respective drying phases within the first drying chamber and the second drying chamber;

the internal volume of the first drying chamber and the internal volume of the second drying chamber are subjected to the second vacuum during respective vacuum drying phases within the first drying chamber and the second drying chamber; and the resin granulates are discharged from the first drying chamber and the second drying chamber during respective discharge phases within the first drying chamber and the second drying chamber.

7. The system of claim 6, wherein the controller is configured to control the first and second hot air inlet valves, the first and second vacuum valves, the first and second convey suction valves, and the first and second material valves so that the first and second drying stations operate simultaneously, in a coordinated manner, such that the loading, heating, vacuum drying, and discharge phases of the first station do not occur simultaneously with the respective loading, heating, vacuum drying, and discharge phases of the second station.

8. The system of claim 6, wherein the controller is configured to control the first and second hot air inlet valves, the first and second vacuum valves, the first and second convey suction valves, and the first and second material valves so that the loading, heating, and/or vacuum drying phases within the second drying chamber occur simultaneously with the discharge phase of the first drying chamber.

9. The system of claim 6, wherein the controller is configured to control the first and second hot air inlet valves, the first and second vacuum valves, the first and second convey suction valves, and the first and second material valves so that the loading, heating, and/or vacuum drying phases within the first drying chamber occur simultaneously with the discharge phase of the second drying chamber.

10. The system of claim 6, wherein the controller is configured to control the first hot air inlet valve, the first vacuum valve, the first convey suction valve, and the first material valve so that the loading, heating, vacuum drying, and discharge phases occur sequentially within the first drying chamber.

11. The system of claim 6, wherein the controller is configured to control the second hot air inlet valve, the second vacuum valve, the second convey suction valve, and the second material valve so that the loading, heating, vacuum drying, and discharge phases occur sequentially within the second drying chamber.

12. The system of claim 1, wherein the source of heated air heater includes:

a heater; and a blower configured to circulate the heated air.

13. The system of claim 1, wherein:

the first vacuum source is a drying vacuum pump; and the second vacuum source is a convey vacuum pump.

14. The system of claim 1, further comprising:

a first return air valve communicatively coupled to the controller and in fluid communication with the source of heated air and the interior volume of the first drying chamber; and a second return air valve communicatively coupled to the controller and in fluid communication with the source of heated air and the interior volume of the second drying chamber.

15. The system of claim 1, further comprising:

a first convey airlock communicatively coupled to the controller and in fluid communication with the first vacuum convey valve; and a second convey airlock communicatively coupled to the controller and in fluid communication with the second vacuum convey valve.

* * * * *